Sept. 9, 1958  R. R. GASPER  2,850,807
TOOL-SETTING APPARATUS
Filed Feb. 24, 1955  2 Sheets-Sheet 1
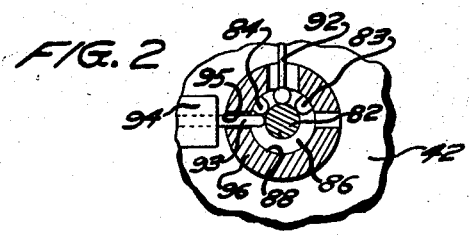
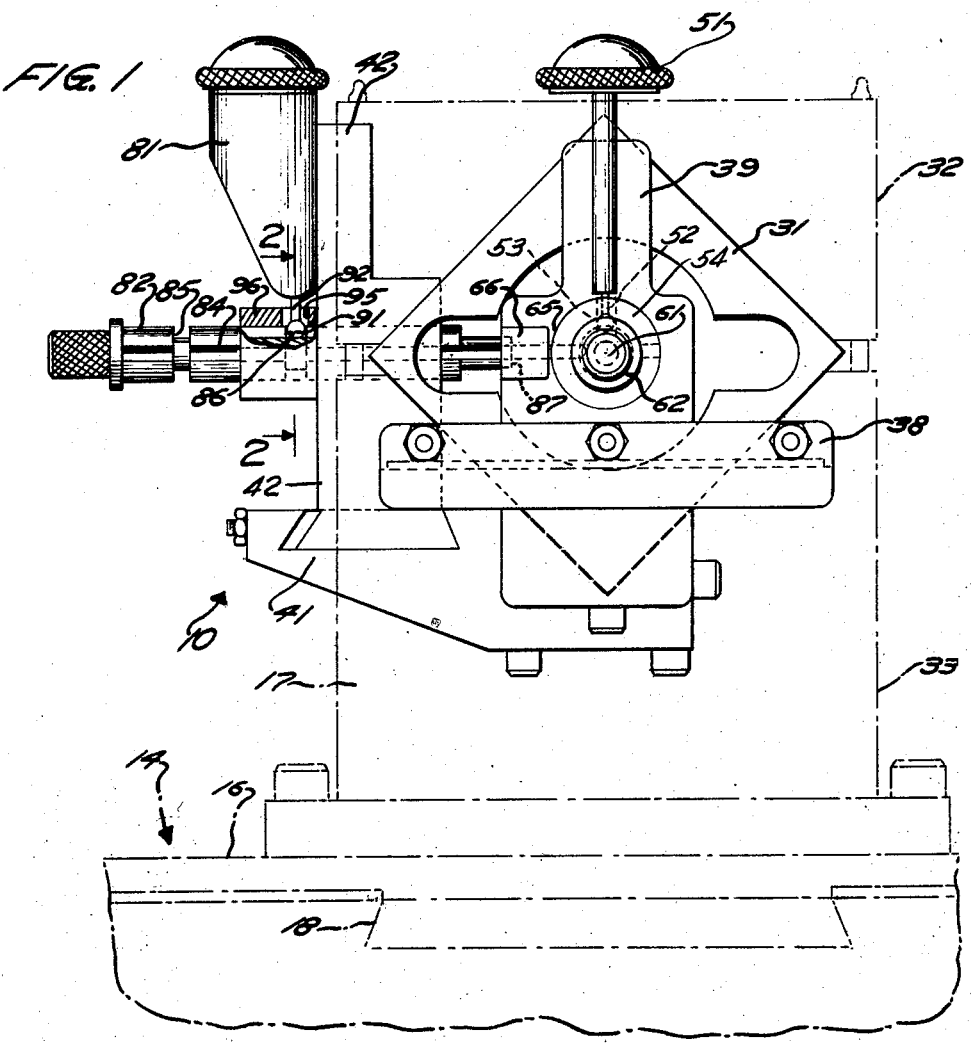
INVENTOR
R. R. GASPER
BY C. P. Hamilton
ATTORNEY Sept. 9, 1958 R. R. GASPER 2,850,807
TOOL-SETTING APPARATUS
Filed Feb. 24, 1955 2 Sheets-Sheet 2
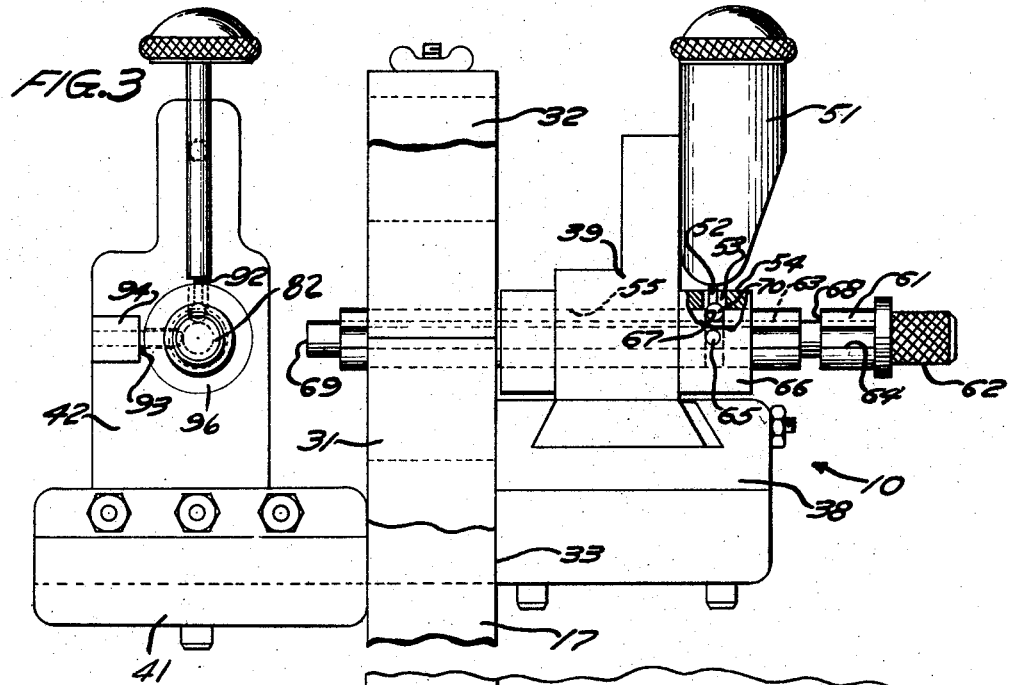
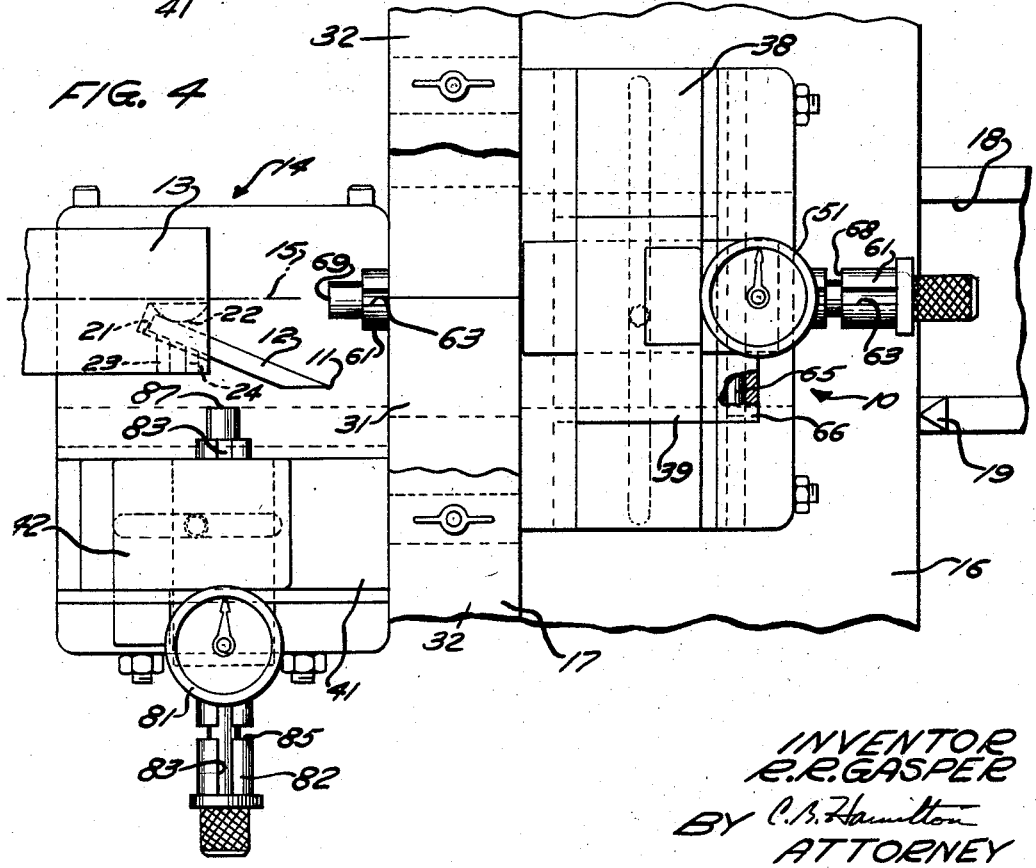
INVENTOR
R. R. GASPER
BY C. B. Hamilton
ATTORNEY United States Patent Office 2,850,807
Patented Sept. 9, 1958

2,850,807
TOOL-SETTING APPARATUS

Robert R. Gasper, Clarendon Hills, Ill., assignor to Western Electric Company, Incorporated, New York, N. Y., a corporation of New York Application February 24, 1955, Serial No. 490,218

7 Claims. (Cl. 33—185)

This invention relates to tool-setting apparatus, and more particularly to apparatus for setting cutting tools in quills of boring machines.

An object of the invention is to provide apparatus for precisely setting tools.

Another object of the invention is to provide apparatus for precisely setting tools of boring machine quills both radially and axially relative to the quills.

A further object of the invention is to provide apparatus which may be clamped in a boring machine workholder just as a workpiece is to be clamped therein and which sets a tool on a quill of the machine in a position in which a cutting portion of the tool is a precise distance from the axis of rotation of the quill and is spaced precisely along that axis.

A tool-setting apparatus illustrating certain features of the invention may include a frame corresponding in shape to that of a workpiece to be processed later and designed to be clamped on a carriage of a machine having a tool to be set in a quill. The frame supports feeler means for indicating the position of the tool along the longitudinal axis of the quill and feeler means for indicating the position of the tool radial of that axis.

A complete understanding of the invention may be obtained from the following detailed description of an apparatus forming a specific embodiment of the invention, when read in conjunction with the appended drawings, in which Fig. 1 is a rear elevation with portions shown in section of an apparatus forming one embodiment of the invention;

Fig. 2 is a vertical section taken along line 2—2 of Fig. 1;

Fig. 3 is a side elevation of the apparatus shown in Fig. 1, and

Fig. 4 is a top plan view of the apparatus shown in Fig. 1.

Referring now in detail to the drawings, there is shown therein a gage 10 for setting a cutting point 11 of a tool 12 fastened to a longitudinally fixed quill 13 of a boring machine 14 rotatable on an axis 15. The boring machine is of a well known type and includes a carriage 16 carrying a clamping fixture 17 and movable along a guideway 18 parallel to the axis 15 of the quill. The carriage is moved automatically a predetermined distance from a stop 19 to the left, as viewed in Fig. 4, toward the quill 13 during a boring operation, but is located against the stop 19 while setting the tool 12. The tool 12 is held in a socket 21 against a convex wall 22 by set screws 23 and 24, and may be adjusted longitudinally in the socket and also angularly relative to the quill to locate the cutting edge 11 in a desired position. Other well known suitable adjusting structure may be provided for adjusting the tool 12 to precisely space the edge 11 as desired both radially and longitudinally of the quill 13.

The gage 10 includes a mounting block 31 corresponding in shape to a workpiece to be bored by the machine 14, and the block 31 is clamped between clamps 32 and 33 of the clamping fixture 17 in a position in which the faces of the block are flush with opposite faces of the clamp 33. A transverse guideway 38 fixed to one side of the block 31 mounts a slide 39 thereon slidable transversely of the guideway 18, and a longitudinal guideway 41 is rigidly fixed to the other side of the block 31 off-center with respect to the block and the quill 13. A slide 42 is slidable along the guideway 41 parallel to the rotational axis 15.

The slide 39 carries rigidly thereon a dial indicator gage 51 of a well known type having a pivotal actuating arm 52 projecting through a slot 53 in a boss 54 of the slide 39 into a bore 55 in the slide 39. A feeler rod 61 having a knurled handle 62 is slidable in the bore 55, and has longitudinal grooves 63 and 64 90° apart into which project the gage arm 52 and a fixed pin 65 mounted on the slide 39 by a lug 66. The rod 61 also has annular grooves 67 and 68 spaced predetermined distances from an end 69 thereof for receiving the pin 65 and a rounded end 70 of the arm 52.

To measure the position of the tool 12 longitudinally, the carriage 16 is kept against the stop, and the rod 61 is slid in the bore 54 until the desired one of the grooves 67 and 68 arrives at the pin 65, the longitudinal grooves 63 and 64 providing clearance for the pin 65 and the arm end 70. The rod 61 then is turned to offset the grooves 63 and 64 from the pin 65 and the arm end 70, and the slide 39 is slid, if necessary, along the guideway 38 to bring the rod end adjacent to the edge 11. The end of the pin 65 projecting into the annular groove 67 or 68 is considerably smaller than the width of that groove but the arm end 70 fits snugly though slidably therein. This permits the rod to be slid along the boss 54 to position the end 69 against the edge 11, and the position of the edge 11 longitudinally of the quill and from the clamping fixture 17 may be calculated by the reading on the dial indicator gage 51 and the known distance from the groove 67 or 68 to the end 69 of the rod 61. The longitudinal position of the tool 12 then may be adjusted in the quill 13 if necessary, and the new position of the edge 11 measured.

Similarly, the radially offset position of the edge 12 may be measured by a dial indicator gage 81 of a well known type fixed to the slide 42. A feeler rod 82 similar to the rod 61 has longitudinal grooves 83 and 84 at 90° and annular transverse grooves 85 and 86 known distances from a feeler end 87. The feeler rod 82 may be slid manually in a bore 88 in the slide 42 with the longitudinal grooves 83 and 84 providing clearance for a rounded end 91 of an actuating arm 92 pivotally mounted on the gage 81 and a pin 93 mounted on a lug 94 of the slide 42 and projecting into a clearance slot 95 in a boss 96 of the slide 42. The pin 93 fits loosely into the annular grooves 85 and 86 while the rounded end 91 fits snugly therein so that the position of the rod may be adjusted longitudinally thereof to move the end 87 of the rod 82 against the edge 11 of the tool 12, after adjusting the slide 42 along the guideway 41, if necessary. The reading of the gage 81 is proportional to movement of the arm 92 thereof, and the distance between the normal or zero position of the end 91 of the arm 92 and the centerline 15 and the distances from each of the grooves 85 and 86 to the end 87 of the feeler rod 82 are known. Hence, the reading of the gage 81 when the end 87 of the rod 82 engages the edge 11 of the tool 12 makes the distance of the edge 11 from the centerline 15 computable. Preferably, the grooves 85 and 86 are so spaced from the end of the rod 82 that the gage 81 reads zero when the tool 12 is precisely located radially of the centerline 15. Thus, the tool 12 may be set for boring a hole of a predetermined diameter and a predetermined depth for the fixed throw or feed distance of the carriage 16.

The rods 61 and 82 may be used to measure the locations of the tool 12 at two radial positions and at two longitudinal positions. Also, other rods (not shown) similar to the rods 61 and 82 but having annular grooves at distances from feeler ends of the rods different from those of the rods 61 and 82 may be substituted for the rods 61 and 82. The quill 13 is in a position such that the tool 12 extends only horizontally when the radial position of the edge 11 is measured.

The above-described gage 10 serves to quickly and precisely locate the edge 11 of the tool 12 both radially and longitudinally of the quill. The gage 10 is simple and sure in its operation, and may be quickly mounted on and taken from the carriage 16.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A tool-setting apparatus for setting a cutting edge of a tool adjustable axially of a tool-holder rotatable on a predetermined axis of a machine also including a work-holder movable toward the tool-holder parallel to the axis of rotation of the tool-holder, which comprises a supporting frame holdable by the work-holder, a feeler having annular and longitudinal grooves therein carried by the frame movable parallel to said axis of rotation for engaging the cutting edge of the tool, and a dial indicator gage having an actuator pivotally mounted to extend within the grooves of said feeler to measure the distance of the cutting edge from the work-holder in an axial direction.

2. A tool-setting apparatus for setting a cutting edge of a tool adjustable axially of a tool-holder rotatable on a predetermined axis of a machine also including a work-holder movable toward the tool-holder parallel to the axis of rotation of the tool-holder, which comprises a supporting frame holdable by the work-holder, a slide slidably mounted on the frame for movement transversely of said axis, a feeler carried by the slide movable parallel to said axis of rotation for engaging the cutting edge, said feeler having annular and longitudinal grooves therein, and gaging means with an actuating arm positioned in the grooves to engage the feeler for measuring the distance of the cutting edge from the work-holder.

3. A tool-setting apparatus for setting a cutting edge of a tool adjustable radially and axially of a tool-holder rotatable on a predetermined axis of a machine also including a work-holder movable toward the tool-holder parallel to the axis of rotation of the tool-holder, which comprises a supporting frame holdable by the work-holder and having a guideway extending in a predetermined direction relative to said axis, a slide movable along the guideway, a feeler carried by the slide movable transversely of said guideway, said feeler having an annular and a longitudinal groove, and a dial indicator gage having an actuating arm positioned within said grooves to engage the feeler and be operable by the feeler.

4. In a machine including a tool-holder rotatable on a predetermined axis, a tool held by the tool-holder adjustably radially of said axis, a carriage movable parallel to said axis, and a work-holder fixed to the carriage for clamping a workpiece, a tool-setting device comprising a frame having a mounting portion designed to be clamped in a predetermined position by the work-holder and a guideway offset from and parallel to said axis when the mounting portion is so clamped, a slide movable along the guideway and having a bore extending therethrough transversely of said axis, a dial indicator gage secured to the slide and having a pivotal actuating arm extending into the bore in the slide, a feeler rod slidable and rotatable in the bore in the slide and having a longitudinal groove providing clearance for the end of the actuating arm and an annular groove for receiving the end of the actuating arm.

5. In a machine including a tool-holder rotatable on a predetermined axis, a tool held by the tool-holder adjustably longitudinally of said axis, a carriage movable parallel to said axis, and a work-holder fixed to the carriage for clamping a workpiece, a tool-setting device comprising a frame having a mounting portion designed to be clamped in a predetermined position by the work-holder and a guideway extending transversely of said axis when the mounting portion is so clamped, a slide movable along the guideway and having a bore therethrough parallel to said axis, a dial indicator gage secured to the slide and having a pivotal actuating arm extending generally transversely of the bore into the bore, and a feeler rod slidable and rotatable in the bore and having a longitudinal groove for receiving the end of the actuating arm and also an annular groove for receiving the end of the actuating arm.

6. In a machine including a tool-holder rotatable on a predetermined axis, a tool held by the tool-holder adjustably radially and longitudinally of said axis, a carriage movable parallel to said axis toward the tool a predetermined distance from a retracted position thereof and a work-holder fixed to the carriage for clamping a workpiece, a tool-setting device comprising a frame having a mounting portion designed to be clamped in a predetermined position by the work-holder and a first guideway extending transversely of said axis when the mounting portion is so clamped, said frame also being provided with a second guideway offset from and parallel to said axis when the mounting portion is so clamped, a first slide movable along the first guideway and having a bore therethrough parallel to said axis, a first dial indicator gage secured to the slide and having a pivotal actuating arm extending generally transversely into the bore, a feeler rod slidable and rotatable in the bore and having a longitudinal groove for receiving the end of the actuating arm and also an annular groove for receiving the end of the actuating arm, a second slide movable along the second guideway and having a bore extending therethrough transversely of said axis, a second dial indicator gage secured to the second slide and having a pivotal actuating arm extending into the bore in the second slide, a second feeler rod slidable and rotatable in the bore in the second slide and having a longitudinal groove providing clearance for the end of the second-mentioned actuating arm and an annular groove for receiving the end of the second actuating arm.

7. A tool-setting apparatus for setting a cutting edge of a tool adjustable axially of a tool holder rotatable on a predetermined axis of a machine also including a work-holder movable toward the tool holder, which comprises a supporting frame mounted in the work-holder, a feeler having annular and longitudinal interconnected grooves therein, a dial indicator mounted to the frame and an actuating arm having one end pivotally fitted in the annular grooves and slidably fitted in the longitudinal grooves and the other end linked to said dial indicator to actuate the indicator in accordance with the movement of the feeler.

References Cited in the file of this patent

UNITED STATES PATENTS

| 2,273,954 | Grass | Feb. 24, 1942 |
| 2,455,076 | Magealson | Nov. 30, 1948 |
| 2,493,332 | Aubin | Jan. 3, 1950 |
| 2,533,024 | Lustrik | Dec. 5, 1950 |
| 2,534,333 | Wyrick | Dec. 19, 1950 |

FOREIGN PATENTS

| 882,127 | France | Feb. 15, 1943 |